United States Patent [19]

Bowerman et al.

[11] 4,427,640

[45] Jan. 24, 1984

[54] SEQUENTIAL PROCESS FOR EXTRACTION AND RECOVERY OF VANADIUM AND URANIUM FROM WET PROCESS ACIDS

[75] Inventors: P. David Bowerman, Edmond, Okla.; Michael F. Lucid, Houston, Tex.

[73] Assignee: Kerr-McGee Chemical Corporation, Oklahoma City, Okla.

[21] Appl. No.: 194,444

[22] Filed: Oct. 6, 1980

[51] Int. Cl.³ .............................................. C01G 43/00
[52] U.S. Cl. ...................................... 423/10; 423/63; 423/321 S
[58] Field of Search ........................ 423/10, 63, 321 S

[56] References Cited

U.S. PATENT DOCUMENTS

| | | | |
|---|---|---|---|
| 2,211,119 | 8/1940 | Hixson et al. | 23/23 |
| 2,859,092 | 11/1958 | Bailes et al. | 423/18 |
| 2,859,094 | 11/1958 | Schmitt et al. | 423/18 |
| 3,131,993 | 5/1964 | Gustison et al. | 23/18 |
| 3,402,026 | 9/1968 | Goren | 423/9 |
| 3,700,415 | 10/1972 | Koerner et al. | 23/312 ME |
| 3,711,591 | 1/1973 | Hurst et al. | 423/10 |
| 3,734,696 | 5/1973 | Lucid et al. | 23/312 ME |
| 3,764,274 | 10/1973 | Lucid | 423/63 |
| 3,836,476 | 9/1974 | Baldwin et al. | 252/301.1 R |
| 3,857,919 | 12/1974 | Hazen et al. | 423/9 |
| 4,105,741 | 8/1978 | Wiewiorowski et al. | 423/10 |
| 4,212,849 | 7/1980 | Lucid et al. | 423/10 |
| 4,327,061 | 4/1982 | Hermann et al. | 423/10 |

Primary Examiner—Edward A. Miller
Attorney, Agent, or Firm—William G. Addison

[57] ABSTRACT

A process for preferentially extracting and recovering vanadium and uranium from wet process acids. The wet process acid first is contacted with a neutral organo-phosphorus compound to extract the vanadium values. The resulting loaded organic phase is separated from the wet process acid due to immiscibility of the acid and organic phases. The vanadium values then are separated from the organic phase by stripping. The raffinate separated from the first organic extractant then is contacted with a second organic extractant comprising a dialkylphosphoric acid and a neutral organo-phosphorus compound to extract the uranium values. The resulting loaded organic phase is separated from the wet process acid due to immiscibility of the acid and organic phases. The organic phase is stripped with a reductive stripping solution and the stripping solution then is oxidized to convert the uranium values to the hexavalent oxidation state. The oxidized solution then is contacted with another organic extractant to reextract the uranium to thereby concentrate the uranium product which then is stripped from the organic product with ammonium carbonate to form ammonium uranyl carbonate.

16 Claims, 2 Drawing Figures

SEQUENTIAL PROCESS FOR EXTRACTION AND RECOVERY OF VANADIUM AND URANIUM FROM WET PROCESS ACIDS

BACKGROUND OF THE INVENTION

1. Field of the Invention

This invention involves a sequential process for the preferential extraction of vanadium and uranium from wet process acids employing neutral organo-phosphorus compounds and dialkylphosphoric acids.

2. Brief Description of the Prior Art

Phosphoric acid generally is produced commercially by one of two methods. One method generally is called the "furnace" method, and the other generally is referred to as the "wet process" method. In the wet process method of producing phosphoric acid, phosphate rock is contacted with a mineral acid such as sulfuric acid. Most phosphate rock contains metal compounds in varying amounts. In many cases, these metal compounds are dissolved from the phosphate rock and appear in the wet process acid as contaminants. Vanadium and uranium compounds are among those dissolved from the phosphate rock, particularly when the rock is from the so-called western deposits of Idaho, Wyoming, Utah and Montana.

Vanadium, however, is an undesirable component of wet process phosphoric acid in that it prevents the use of the phosphoric acid in making animal feed supplements, as the amount of vanadium must be kept at a low level in such animal feed supplements. Similarly, uranium is undesirable in such feed supplements.

On the other hand, vanadium and uranium are valuable materials and wet process phosphoric acid can be an important source of these materials. Therefore, a process for the sequential recovery of vanadium and uranium from wet process phosphoric acid provides an important benefit, in that the vanadium and uranium are converted from undesirable contaminants to valuable by-products.

There have been many attempts made in the past to recover vanadium from wet process acid. One such process is described in U.S. Pat. No. 2,211,119 wherein the vanadium is extracted from the acid with an organic extractant which preferably comprises isopropyl ether. U.S. Pat. No. 3,131,993 describes a process in which the preferred organic extractant is di(2 ethylhexyl)phosphoric acid. In U.S. Pat. No. 3,700,415, assigned to the same assignee as the present invention, there is described a process for extracting vanadium from wet process phosphoric acid utilizing certain neutral organophosphorus compounds as an extractant. U.S. Pat. No. 3,734,696, assigned to the same assignee as the present invention, discloses a process for extracting vanadium from acidic mixtures containing fluoride using aliphatic amines as an extractant.

Further, there have been several processes developed for recovering uranium from wet process acids derived from eastern phosphate deposits. Typical of such uranium recovery processes is U.S. Pat. No. 2,859,092, using alkylphosphoric, alkylphosphonic and alkylphosphitic acids as an extractant and U.S. Pat. Nos. 2,859,094 and 3,711,591 using, as an extractant, a mixture of a dialkyl phosphoric acid and a neutral organophosphorus compound.

Furthermore, in U.S. Pat. No. 3,826,476, assigned to the same assignee as the present invention, there is described a process for the simultaneous coextraction of uranium and vanadium from wet process phosphoric acid utilizing, as an extractant, a mixture of dialkyl phosphoric acid, trialkylphosphine oxide and an organic diluent.

SUMMARY OF THE INVENTION

It now has been discovered that the process hereinafter set forth is capable of preferentially extracting and recovering vanadium and uranium in an economically efficient manner from wet process acids.

In operation, the wet process acid first is treated to oxidize the vanadium and uranium to a particular valence state and remove impurities that separate as solids from the wet process acids to thereby stabilize the solution against subsequent impurity precipitation to facilitate subsequent solvent extraction.

The wet process acid then is contacted with an organic extractant comprising a neutral organo-phosphorus compound, such as for example, tri-n-octylphosphine oxide in an organic solvent to extract the vanadium values. The vanadium values preferentially are extracted from the acid into the organic and the resulting loaded organic phase then can be separated easily from the wet process acid due to the immiscibility of the acid and organic phases.

The separated organic phase is scrubbed with water after which the contained vanadium values can be recovered, as for example, by stripping with a suitable stripping solution such as a 10 percent solution of sodium carbonate. The vanadium may be precipitated from the stripping solution by conventional prior art methods.

The raffinate separated from the first organic extractant is contacted with another organic extractant comprising a dialkylphosphoric acid, a neutral organo-phosphorus compound and a hydrocarbon solvent to extract the uranium values from the wet process acid. The loaded organic phase then can be separated from the wet process acid raffinate due to the immiscibility of the acid and organic phases. The separated organic phase is stripped with a reductive stripping solution. The stripping solution is separated from the organic phase and oxidized to convert the uranium to the hexavalent oxidation state before being treated in a second organic extraction cycle where the uranium is extracted by an organic phase and then is stripped from the organic phase with an aqueous solution of ammonium carbonate to produce a product consisting essentially of ammonium uranyl carbonate.

DESCRIPTION OF THE PREFERRED EMBODIMENT

The process of the present invention is applicable to aqueous acidic solutions containing vanadium and uranium. The instant process is particularly applicable to wet process phosphoric acid obtained from the western phosphate deposits which contain significant amounts of vanadium and uranium.

Prior to contacting the aqueous acidic solution with the first organic extractant, the aqueous solution is treated, if necessary, to oxidize the solution to make certain that the vanadium contained therein is in the pentavalent oxidation state (V) and the uranium is in the hexavalent oxidation state (VI) and stabilize the solution against substantial precipitation of impurities which would interfere with subsequent solvent extractions. If the vanadium and uranium are not present as vanadium (V) and uranium (VI) the extraction process of the present invention is not satisfactory as vanadium and uranium in the lower oxidation states do not form a complex with the extractants contemplated in the scope of this invention.

Figure 1:
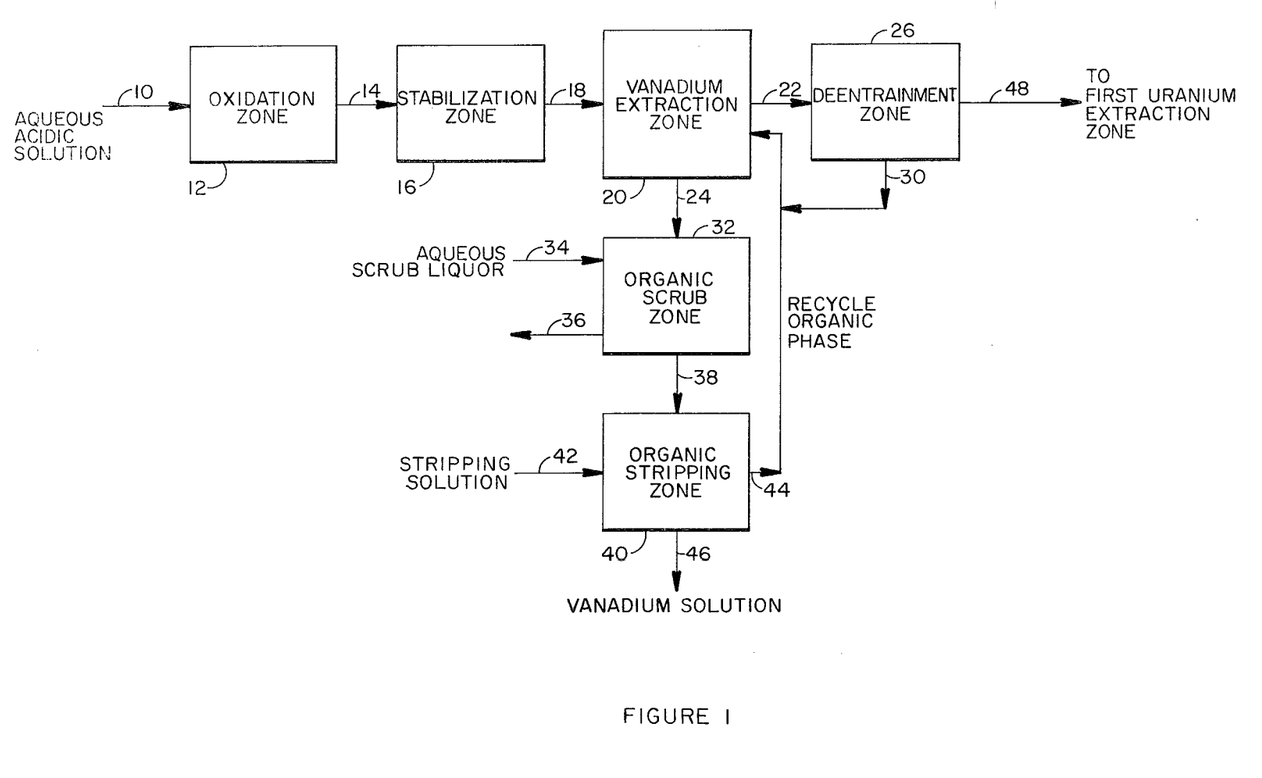
FIG. 1 is a schematic illustration of the first portion of the process wherein vanadium extraction and recovery is effected.

Turning now to FIG. 1, the aqueous acidic solution is introduced into an oxidation zone 12 through a conduit 10. The aqueous acidic solution may be oxidized by any known method, such as, for example, with sodium chlorate, manganese dioxide, permaganates, dichromates, peroxydisulfates, ceric salts or ozone within oxidation zone 12. The oxidizer should be added in an amount sufficient to provide at least the stoichiometric amount for oxidation of all the vanadium to vanadium (V) and uranium to uranium (VI). When there are other oxidizable species present in the aqueous acidic solution, such as are found in wet process acid, for example, it is desirable to provide an excess of said stoichiometric amount to insure that substantially all the vanadium and uranium values present are oxidized. Also, weaker oxidizing agents can be used to perform a part of the oxidation prior to completion of the oxidation with one or more of the stronger oxidants. Examples of weak oxidants for partial oxidation are air, oxygen and hydrogen peroxide. A preferred oxidation technique comprises contacting the aqueous acidic solution with oxygen at a temperature in the range of from about 35 degrees C. to about 80 degrees C., either with or without a catalyst, to effect about two thirds of the necessary oxidation and then completing the process using manganese dioxide. This particular technique has the advantage of reducing the quantity of expensive oxidants required and reducing the quantity of soluble impurities added to the aqueous acidic solution.

The change in valence state of the vanadium and uranium also may be achieved using electrolytic techniques. Such techniques have the advantage of not adding any additional foreign dissolved material to the aqueous acidic solution.

The oxidized aqueous acidic solution is withdrawn from oxidation zone 12 through a conduit 14 and introduced into a stabilization zone 16. The solution is stabilized against undesired later precipitation of impurities during the solvent extraction steps by pre-removal of such impurities through crystallization and separation thereof in this zone. Soluble impurities contained in wet process phosphoric acid include, for example, calcium, iron, sodium, potassium, magnesium and aluminum salts. Wet process phosphoric acid can be stabilized by introducing the same into a vessel within stabilization zone 16 which contains a crystal seed bed comprised of crystallized impurities to facilitate precipitation of the contained impurities which are in supersaturated form. Supersaturation of the impurities is effected through cooling and evaporation of water from a portion of the wet process phosphoric acid and then recycling the same to the seed bed-containing vessel. A second portion of the wet process phosphoric acid containing precipitated impurities is withdrawn from the vessel and introduced into a separator within zone 16.

In the separator, the wet process phosphoric acid containing precipitated impurities is separated into a substantially solids-free stream and a solids-containing stream. The solids-containing stream is withdrawn from the separator and a portion thereof may be recycled to the seed bed-containing vessel to maintain the crystal seed bed. The substantially solids-free stream is withdrawn and introduced into a clarifier, if necessary, to further clarify the aqueous solution. The wet process phosphoric acid then is admixed with an aqueous diluent to reduce the concentration of the precipitable impurities remaining therein to a concentration below their saturation level. The aqueous diluent can comprise a portion of the water initially evaporated from the wet process phosphoric acid.

The precipitation of impurities and dilution of the wet process phosphoric acid as hereinbefore described effects a stabilization of the impurities remaining in the aqueous solution without a significant change in the phosphate concentration of the solution.

The stabilized aqueous acidic solution is withdrawn from zone 16 through a conduit 18 and then introduced into a vanadium extraction zone 20. In vanadium extraction zone 20, the aqueous acidic solution is contacted with an organic extractant comprising a neutral organophosphorus compound dissolved in a water immiscible organic solvent or diluent. The neutral organo-phosphorus compounds of this invention are those compounds having the following general formula:

where R, R' and R'' are organic hydrocarbon radicals selected from the group consisting of hydrogen, alkyl, cycloalkyl, aryl, aralkyl, alkoxy and aryloxy radicals. R, R' and R'' may be the same or different organic products but may not all be hydrogen. R, R' and R'' may be further defined as organic hydrocarbon radicals selected from the group consisting of:

alkyl of up to 12 carbon atoms;
cycloalkyl of up to 12 carbon atoms;
aryl of up to 18 carbon atoms;
aralkyl of up to 18 carbon atoms;
alkoxy of up to 12 carbon atoms; and
aryloxy of up to 18 carbon atoms.

Mixtures of compounds having the general formula as defined above also may be used.

Exemplary alkyl radicals of the above formula are the butyl, amyl, hexyl, and octyl radicals. An exemplary cycloalkyl radical of the present invention is cyclohexyl. Aralkyl radicals include benzyl, phenylethyl, phenylhexyl, naphthylmethyl, and naphthylhexyl radicals. Aromatic radicals include phenyl, naphthyl, and anthracyl. An alkoxy radical is the butoxy radical. It is to be understood that the alkyl, aralkyl, and aryl radicals may contain conventional substituents such as halo, nitro, hydroxy, alkoxy, and amino.

In addition to the tertiary phosphine oxides, it is to be understood that the corresponding oxonium salts are within the scope of the claimed invention. Examples of oxonium salts are tri-n-octylphosphinoxonium bisulfate, tri-n-octylphosphinoxonium nitrate, and tri-n-butylphosphinoxonium nitrate.

In addition to the tertiary phosphine oxides contemplated, it has also been discovered that another neutral organo-phosphorus compound, tributylphosphate, can be used to extract vanadium from aqueous acidic solutions.

According to a preferred embodiment of the present invention are the compounds wherein R, R' and R" are alkyl radicals of from 4 to 12 carbon atoms. An especially preferred compound is tri-n-octylphosphine oxide.

In accordance with the present process, the neutral organo-phosphorus compounds are dissolved in a water-immiscible organic solvent or diluent prior to contacting the same with the pentavalent vanadium containing solution. The term "water-immiscible organic solvent" as used herein refers to an organic material normally liquid at ambient temperatures which is substantially, but not necessarily entirely, insoluble in water. The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents), and the like. Solvents which contain functional groups can also be employed providing that the functional groups do not adversely affect the extraction.

Generally, the neutral organo-phosphorus compounds may be employed in widely varying amounts. Generally, the amount present will be from about 0.3 percent to about 15 percent by weight based on the total organic phase with an amount of from about one to 10 percent by weight being particularly preferred and an amount of from about 5.0 percent to about 10 percent by weight being especially preferred. The phosphine oxides useful in the process of the present invention are also characterized as having a solubility of at least 0.3 percent by weight in the water-immiscible organic solvent used to make up the organic phase and substantially complete insolubility in water.

Tributylphosphate also is effective as the extractant. However, it has been found that it must be present in amounts of from about 25 to 100 percent by weight of the organic phase.

It has further been found that the addition of tributylphosphate to the organic solvent when a tertiary phosphine oxide is used as the extractant will increase the rate of extraction. The addition of amines and amine salts to the organic solvent also has been found to increase the rate of extraction.

In the case of some acidic solutions, it has been found that not only can mixtures of phosphine oxides and amines or amine salts extract vanadium (V) from acidic solutions, but, furthermore, the combination of these reagents gives better extraction than each reagent alone at equivalent concentration. The combination of reagents can be used at a lower pH than the conventional amines and amine salts.

It has been found in the practice of this invention that fluoride must be present in the acidic mixture in order for the extractants of the present invention to properly complex the vanadium (V). Although the exact theory of the complexation is not known, it is believed that the fluoride is complexed with the vanadium (V) and the extractant.

The amount of fluoride present in the mixture preferably is about 0.25 mole per mole of vanadium present although a large excess of fluoride does not harm the extraction. Fluoride is a natural component of wet process phosphoric acid and therefore wet process phosphoric acid is particularly suited for the extraction process of the present invention.

The amount of organic extractant phase to be used for most efficient extraction is from about 0.15 to 10 times the volume of aqueous acidic solution to be treated. The ratio of organic extractant phase to aqueous phase to be used is dependent on the concentration of neutral organo-phosphorus compound in the extractant phase, the temperature at which the extraction is performed, the contact time between the two phases and the amount of vanadium in the aqueous acidic solution.

It has been found that for the case of tri-n-octylphosphine oxide (TOPO), most efficient extraction of vanadium is obtained when two to ten moles of TOPO per mole of vanadium present in the aqueous solution is used in the organic phase with four to eight moles of TOPO per mole of vanadium being particularly preferred. Thus, it can be seen that the ratio of organic extractant phase to aqueous phase is dependent on the concentration of TOPO in the extractant phase. As previously stated, the concentration of extractant can be from about 0.3 to 15 percent by weight. A preferred extractant concentration for TOPO is 0.15 molar in which case an organic to aqueous ratio of from about 0.35 to 1.7 would be required to provide four to eight moles of TOPO per mole of vanadium present in the aqueous acidic solution. Although higher concentrations of extractant might be used, it has been found that in such instances disengagement of the liquid mixture into the organic and aqueous phases is somewhat slow.

In general, the extraction can be effected at a temperature of from about ambient temperature to about 60 degrees C. Temperatures between about 30 degrees C. and 50 degrees C. are preferred and a temperature of about 45 degrees C. is especially preferred.

It has been found that contact time between the organic extractant phase and the aqueous phase is an important variable to consider when extracting vanadium from, for example, wet process phosphoric acid. Longer contact times result in increased vanadium extraction. In practice, contact times of from about one to 60 minutes are satisfactory with about 5 minutes to 30 minutes per contact being expecially preferred at temperatures of from about 30 degrees to 50 degrees C.

The extraction is performed on a batch basis, or on a continuous basis, such as in a continuous countercurrent multistage extraction system.

In a preferred method of exacting the vanadium (V) from the aqueous acidic solution, the vanadium extraction zone 20 comprises apparatus providing four countercurrent contacting stages. The aqueous acidic solution is metered into the first stage to contact and admix with the organic phase comprising 0.15 molar tri-n-octylphosphine oxide in kerosene which is metered into the fourth stage at an organic to aqueous flow ratio of 1:1. Under these conditions, the equilibrium mixing times are about eight minutes in each stage.

The preferred embodiment for the extraction of the vanadium (V) can be varied with respect to the number of stages and the apparatus utilized. The ratio of the aqueous to organic phases can be varied as can the ratio of extracting agent to organic diluent. The type of apparatus can similarly be varied within the scope of the invention, and it is within the scope of the present invention to use any apparatus which will allow mixing of the components and the separation of the two phases.

The aqueous raffinate exits from the fourth stage of extraction zone 20 through a conduit 22 to enter a deentrainment zone 26. The raffinate is passed through a coalescer in deentrainment zone 26 to aid in removing any residual organic phase present in the raffinate. The deentrainment zone also can include a settling tank. The surface of the tank periodically is skimmed to remove the collected organic phase. The organic phase reclaimed in the deentrainment zone is recycled to vanadium extraction zone 20 through a conduit 30. The raffinate is withdrawn from deentrainment zone 26 through a conduit 48 for additional treatment to be described hereinafter.

The vanadium loaded organic phase is withdrawn from vanadium extraction zone 20 through a conduit 24 and introduced into an organic scrub zone 32. The number of stages in the scrub circuit can be varied and operated either cocurrently or countercurrently as the conditions require. Similarly, the amount of water to be used relative to the amount of organic phase can be varied. The organic to aqueous scrubbing ratio can be in the range of from about 1:1 to about 100:1. A preferred organic to aqueous scrubbing ratio is in the range of from about 25:1 to about 75:1. Optimum conditions as to the number of stages, the amount of water and the equilibrium pH can be determined by tests known to those skilled in the art.

In a preferred embodiment, scrub zone 32 comprises a three stage countercurrent scrub circuit using mixer-settlers. The loaded organic phase is metered into the first mixer-settler and the aqueous scrub liquor is metered into the third mixer-settler at an organic to aqueous scrubbing ratio of about 50:1 through a conduit 34. The organic to aqueous ratio within each stage is maintained at about 1:1 by means of intrastage recycle. The equilibrium mix time in each stage is about 6 to 8 minutes.

The aqueous scrub liquor exits from the scrub circuit of organic scrub zone 32 through a conduit 36. The scrubbed organic phase is clear and is withdrawn from organic scrub zone 32 through a conduit 38 and introduced into an organic stripping zone 40.

The vanadium is stripped from the organic with an alkaline agent. Alkaline agents which may be used include ammonia, sodium hydroxide, sodium carbonate, ammonia-ammonium chloride mixtures, ammonia-ammonium sulfate mixtures and the like, sodium carbonate being preferred.

As alternate stripping agents, sulfur dioxide solutions, sulfurous acid-sulfuric acid mixtures and other vanadium reducing agents may be used. In such cases the vanadium is stripped from the extractant by reducing the pentavalent vanadium to tetravalent vanadium. Tetravalent vanadium is not extracted by neutral organo-phosphorus extracting agents and thus reports to the aqueous phase.

According to a preferred stripping method of the present invention, the vanadium is stripped from the solvent with sodium carbonate solution. The stripping operation is controlled by maintaining a pH of about 5.1 to about 5.75 in the stripping zone 40 through a pH controller that operates an automatic valve.

The stripped organic phase is withdrawn from stripping zone 40 through a conduit 44 and recycled to the vanadium extraction zone 20.

The stripping solution is withdrawn from organic stripping zone 40 through a conduit 46. When the aqueous acidic solution is wet process acid, the stripping solution from stripping zone 40 containing the recovered vanadium normally also contains minor quantities of phosphate and fluoride which are removed by precipitation with calcium chloride and magnesium oxide. In a preferred embodiment, soda ash is added to the recovered stripping solution to maintain the pH at about 8.0. A solution of calcium chloride then is added to precipitate about 75 percent of the phosphate remaining. After allowing a reaction time of about 4 hours, ammonia is added to the solution to raise the pH to about 9.0 and magnesium oxide is added to precipitate the remaining phosphate. The solution is maintained at a temperature of about 60 degrees C. for about 12 hours to substantially complete the reaction.

The precipitated solids are removed from the purified vanadium solution by filtration or the like. The filter cake can be washed with water to remove an entrained vanadium solution. The wash solution then can be added to the vanadium solution.

The purified vanadium solution can be precipitated batch-wise to recover the vanadium in the form of ammonium metavanadate. In a preferred embodiment, ammonium sulfate is added to the warm solution to salt out the ammonium metavanadate. The solution can be heated to dissolve the ammonium sulfate, if necessary. Cooling the solution to a temperature of about 20 degrees C. to about 25 degrees C. provides a rapid and efficient precipitation. The ammonium metavanadate can then be recovered by filtration.

The stripping solution withdrawn through conduit 46 also can be treated by any other known technique to recover the vanadium therefrom.

Figure 2:
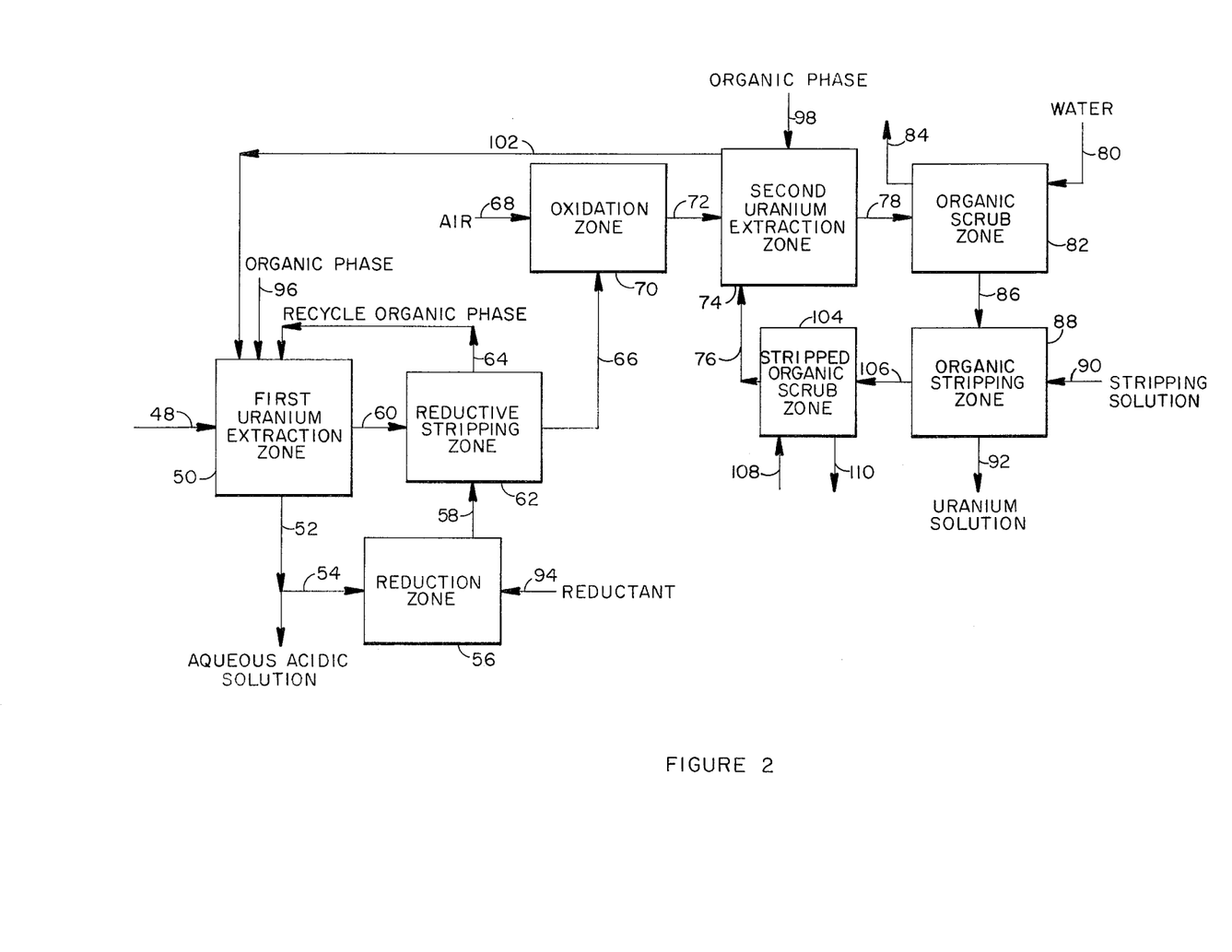
FIG. 2 is a schematic illustration of the uranium extraction and recovery portion of the process of this invention.

The raffinate withdrawn through conduit 22 from vanadium extraction zone 20 contains uranium (VI). Turning now to FIG. 2, the raffinate in conduit 22 is passed through a conduit 48 to enter a first uranium extraction zone 50. In first uranium extraction zone 50, the aqueous acidic solution is contacted with an organic extractant phase comprising a dialkylphosphoric acid and a neutral organo-phosphorus compound dissolved in a water immiscible organic solvent introduced through a conduit 96. The neutral organo-phosphorus compound is at least one member selected from the group previously described herein for the extraction of vanadium. The water immiscible organic solvent also is selected from those previously described as suitable for use in the present invention. Preferably, the neutral organo-phosphorus compound is the same compound which was previously selected for the extraction of vanadium from the aqueous acidic solution. Most preferably, the neutral organo-phosphorus compound is tri-n-octylphosphine oxide. The dialkylphosphoric acids of this invention are those having the following general formula:

where $R_1$ and $R_2$ represent alkyl radicals, the total number of carbon atoms in said dialkylphosphoric acid being at least ten.

Exemplary dialkylphosphoric acids include di(2 ethylhexyl) phosphoric acid, diisooctylphosphoric acid, diisobutylphosphoric acid, di(2 ethyl-4-methylpentyl) phosphoric acid and di(2 propyl-4-methylpentyl) phosphoric acid. Preferably, the dialkylphosphoric acid comprises di(2 ethylhexyl) phosphoric acid. While specific reference hereafter will be made to di(2 ethylhexyl) phosphoric acid, it is to be understood that the general concentrations or conditions would be equally applicable to any other suitable acid.

Generally, the di(2 ethylhexyl) phosphoric acid present in the organic extractant will be in the range of from about one percent to about 30 percent by weight based on the total organic phase with an amount of from about 10 percent to about 25 percent being preferred. The neutral organophosphorus compound present in the organic extractant will be in the range of from about one percent to about 15 percent by weight of the total organic phase with an amount of from about 3 percent to about 8 percent being preferred.

The amount of organic extractant phase used for most efficient extraction is from about 0.15 to 10 times the volume of aqueous acidic solution to be treated. The ratio of organic extractant phase to aqueous phase to be used is dependent on the concentration of the di(2 ethylhexyl) phosphoric acid and neutral organo-phosphorus in the extractant phase, the temperature at which the extraction is performed, the contact time between the two phases and the amount of uranium in the aqueous acidic solution.

It has been found that for the case of an extractant comprising di(2 ethylhexyl) phosphoric acid (D2EHPA) and tri-n-octylphosphine oxide (TOPO), most efficient extraction of uranium is obtained when the molar ratio of D2EHPA to TOPO is in the range of from about 20:1 to about 1:10. A preferred ratio of D2EHPA to TOPO is from about 10:1 to about 1:6 and an especially preferred ratio is from about 6:1 to about 1:4 in which case an organic to aqueous ratio of from about one to one would be required. Although higher concentrations of D2EHPA and TOPO can be used, it has been found that in such instances the liquid mixture tends to separate too slowly into the organic and aqueous phases.

In general, the extraction can be effected at a temperature of from about ambient temperature to about 60 degrees C. Temperatures between about 30 degrees C. and 50 degrees C. are preferred and a temperature of about 45 degrees C. is especially preferred.

The extraction is performed on a batch basis, or on a continuous basis, such as in a continuous countercurrent multistage extraction system.

In a preferred method of extracting the uranium (VI) from aqueous acidic solution, the first uranium extraction zone 50 comprises apparatus providing four countercurrent contacting stages. The aqueous acidic solution is metered into the first stage to contact and admix with the organic phase comprising 0.4 molar di(2 ethylhexyl) phosphoric acid and 0.1 molar tri-n-octylphosphine oxide in kerosene which is metered into the fourth stage at an organic to aqueous flow ratio of one to one. Under these conditions, the equilibrium mixing times are about 5 minutes in each stage.

The preferred embodiment for the extraction of the uranium (VI) can be varied with respect to the number of stages and the apparatus utilized. The ratio of the aqueous to organic phases can be varied as can the ratio of extracting agents to organic diluent. The type of apparatus can similarly be varied within the scope of the invention, and it is within the scope of the present invention to use any apparatus which will allow mixing of the components and the separation of the two phases.

The aqueous raffinate exits from the fourth stage of first extraction zone 50 through a conduit 52 for further treatment. A portion of the raffinate is withdrawn from conduit 52 through a conduit 54 and introduced into a reduction zone 56 wherein a reducing solution is formed. Any suitable agent can be introduced into reduction zone 56 to admix with the raffinate to form the reducing solution. In a preferred embodiment, the ferric iron in the raffinate is reduced to the ferrous state by contact with a reductant, the resulting ferrous iron solution then comprising the reducing solution. Metallic iron or other suitable reductant is introduced into reduction zone 56 through a conduit 94 to effect the reduction of the ferric iron, or alternatively the ferric iron can be electrolytically reduced. The reducing solution is withdrawn from reduction zone 56 through a conduit 58 and introduced into a reductive stripping zone 62.

The uranium loaded organic phase is withdrawn from first uranium extraction zone 50 through a conduit 60 and introduced into the reductive stripping zone 62. The organic phase preferably is countercurrently contacted with the reducing solution which preferably now contains 10 to 35 grams per liter of ferrous iron. The reducing solution causes the uranium (VI) to be converted to uranium (IV) which separates from the organic phase into the strip solution which is withdrawn through a conduit 66 for introduction into an oxidation zone 70. The uranium-barren organic phase is withdrawn from zone 62 and recycled through a conduit 64 to first uranium extraction zone 50. The reductive stripping zone 62 may also contain provisions for scrubbing or deentraining aqueous solutions from the organic stream prior to recycle for extraction.

In oxidation zone 70, the aqueous solution is sparged with air or oxygen at a temperature in the range of from about 70 to 90 degrees C. to convert the uranium (IV) to uranium (VI), electrolyzed, or treated with any other suitable oxidizing agent, such as hydrogen peroxide, to effect the same result. The air is introduced into oxidation zone 70 through a conduit 68. The oxidized strip solution is withdrawn from oxidation zone 70 and introduced into a second uranium extraction zone 74 through a conduit 72.

In second extraction zone 74, the oxidized strip solution is contacted with another quantity of organic phase introduced through a conduit 98. The oxidized solution now is concentrated in uranium by a factor of from about 35 to about 100 compared to the original aqueous acidic solution. In addition, the concentration of contaminants such as organic acids, iron and the like are at least a factor of about 50 lower, relative to uranium, than in the original aqueous solution. Thus, higher grade products can be produced than otherwise would be possible.

In a preferred method, second uranium extraction zone 74 comprises four countercurrent contacting stages. The oxidized strip solution is metered into the first stage to contact and mix with the organic phase which is metered into the fourth stage at an organic to aqueous flow ratio of one to one. Under these conditions the equilibrium mixing times are about 5 minutes in each stage. The aqueous phase is withdrawn from second uranium extraction zone 74 through a conduit 102 for recycle to first uranium extraction zone 50. The organic phase is withdrawn from zone 74 through a conduit 78 and introduced into an organic scrub zone 82. Water of suitable quality is introduced into scrub zone 82 through a conduit 80.

The number of stages in the scrub circuit can be varied and operated either cocurrently or countercurrently as the conditions require. Similarly, the amount of water to be used relative to the amount of organic phase can be varied. The organic to aqueous scrubbing ratio can be in the range of from about 1:10 to about 10:1. A preferred organic to aqueous scrubbing ratio is in the range of from about 1:5 to about 5:1.

In a preferred embodiment, scrub zone 82 comprises a three stage countercurrent scrub circuit using mixer-settlers. The loaded organic phase is metered into the first mixer-settler and the aqueous scrub liquor is metered into the third mixer-settler at an organic to aqueous scrubbing ratio of about 5:1. The equilibrium mix time in each stage is about 4 to 8 minutes. The aqueous scrub liquor is withdrawn from scrub zone 82 through a conduit 84 for recycle or use in other processes. The scrubbed organic phase is withdrawn from scrub zone 82 through a conduit 86 for introduction into an organic stripping zone 88.

In organic stripping zone 88, the organic phase is contacted with a stripping solution comprising, for example, ammonium carbonate, introduced through a conduit 90 to separate the uranium from the complex with the organic phase. Contacting the organic phase with a solution of ammonium carbonate produces either a solution or slurry of uranium as ammonium uranyl tricarbonate (AUT). The solubility of the uranium in the product solution is inversely dependent of the ammonium carbonate concentration in the strip solution. When a sufficiently concentrated strip solution is used, an AUT slurry is formed which is easily filtered and washed and which can be calcined to yield $U_3O_8$ by decomposition of the AUT. Optimum conditions as to the number of stripping stages and the concentration of the stripping solution can be determined by tests known to those skilled in the art.

In one preferred embodiment, the stripped organic phase then is introduced into a stripped organic scrub zone 104 through a conduit 106. In scrub zone 104, the organic phase is scrubbed with an acidic scrub liquor comprising dilute sulfuric acid (approximately 5 percent) introduced through a conduit 108. The scrubbing converts the dialkylphosphoric acid in the organic phase from the ammonium salt produced during the stripping process back to acid form. Removal of the ammonium ion prior to recycling of the organic phase for further extraction eliminates the possibility of precipitation of ammonium containing solids that otherwise could form in the extraction equipment upon contact with the aqueous acidic solution. The scrub liquor is withdrawn from scrub zone 104 through a conduit 110 for recycle or use in other processes. The organic to aqueous scrubbing ratio preferably is about 5:1 and no intrastage recycle is necessary. The equilibrium mix time is from about 4 to 8 minutes and the temperature preferably is about 40 degrees C. to 70 degrees C.

The scrubbed organic phase is withdrawn from scrub zone 104 through a conduit 76 for recycle to second uranium extraction zone 74. The uranium product is withdrawn from stripping zone 88 through a conduit 92 for recovery.

The process hereinbefore described effects a recovery of in excess of about 85 percent of the vanadium present in the aqueous acidic solution and in excess of about 96 percent of the uranium. The particular arrangement of the process operations offers both economic and processing advantages over other processes for the recovery of vanadium and uranium.

It is known that vanadium recovery from aqueous acidic solutions is depressed by the presence of dialkylphosphoric acid in organic extractant of comprising neutral organo-phosphorus compounds. Similarly, the presence of neutral organo-phosphorus compounds in the organic extractant for the recovery of uranium in quantities that exceed a molar ratio of di(2 ethylhexyl) phosphoric acid to neutral organo-phosphorus compound of about 4:1 is known to depress uranium extraction. The process of the present invention overcomes these processing problems by preventing the possibility of detrimental cross contamination of one organic extractant with another extractant through solubility with or entrainment in the aqueous acidic solution. The neutral organo-phosphorus compound of the vanadium extractant also is present in the uranium extractant. Thus, any carry-over of neutral organo-phosphorus compounds to the uranium extraction process can be compensated for merely by adjusting the amount of di(2 ethylhehexyl) phosphoric acid, generally the less costly reagent, in the uranium extractant to maintain the desired molar ratios for the composition of the extractant. If the vanadium and uranium extraction processing operations were to be reversed, the accummulations of di(2 ethylhexyl) phosphoric acid in the neutral organo-phosphorus solvent will substantially depress vanadium recovery from the aqueous acidic solution. Further, the di(2 ethylhexyl) phosphoric acid will cause the extraction of uranium from the aqueous acids solution along with the vanadium that is extracted. When an attempt then is made to strip the vanadium from the organic phase, some of the uranium also would be stripped and thereby contaminate the vanadium product unless complicated purification procedures are employed. The present invention avoids problems resulting from coextraction of vanadium and uranium and permits the production of high quality product streams containing a minimum of impurities. Furthermore, the presence of the uranium extraction sequentially after the vanadium extraction minimizes the loss of valuable neutral organo-phosphorus compound by reextracting any entrained or solubilized organic material from the vanadium raffinate stream.

To further illustrate the process of the present invention the following example is provided.

EXAMPLE

A wet process phosphoric acid (WPA) stream containing 1.67 g $V_2O_5$/1 and 110 mg $U_3O_8$/1 is oxidized to convert the vanadium to the pentavalent oxidation state and the uranium to the hexavalent oxidation state. The WPA is stabilized to prevent solids formation during the operation of the vanadium and uranium extraction processes. The WPA then is introduced into a four stage countercurrent vanadium extraction zone to contact an organic extractant comprising 0.15 molar tri-n-octylphosphine oxide in kerosene. The organic to aqueous ratio in each stage is 1:1 with an 8 minute mix time in each stage. The temperature of the WPA is maintained at about 45 degrees C. The vanadium loaded organic phase is withdrawn from the extraction zone and scrubbed in a three stage scrubbing circuit. The organic to aqueous scrubbing ratio is maintained at about 50:1 and the organic to aqueous ratio in each stage is maintained at 1:1 by intrastage recycle. The temperature is maintained at about 45 degrees C. and the mix time is about 6 minutes in each stage. The pH of the scrubbed organic phase then is adjusted to about 5.3 and stripped using a solution comprising 100 grams of sodium carbonate per liter in a two stage process. The organic to aqueous ratio of the stripping process is about 80:1 with an organic to aqueous ratio in each stage of about 1:1. The mix time in each stage is about 6 minutes and the temperature is maintained at about 45 degrees C.

The vanadium recovery is found to exceed 85 percent of the vanadium present in the WPA.

The WPA raffinate from the vanadium extraction zone then is introduced into a first four stage countercurrent uranium extraction zone. The WPA raffinate is contacted with an extractant comprising 0.4 molar di(2 ethylhexyl) phosphoric acid and 0.1 molar tri-n-octylphosphine oxide in kerosene. The organic to aqueous ratio in each stage is 1:1 with a 5 minute mix time in each stage. The temperature is maintained at about 45 degrees C. The uranium loaded organic phase is withdrawn from the first extraction zone and stripped with a solution of WPA containing about 30 grams per liter ferrous iron. The uranium containing reductive stripping solution then is oxidized by sparging with air at a temperature of about 90 degrees C. to oxidize the uranium back to the hexavalent oxidation state. The oxidized stripping solution is introduced into a second four stage countercurrent uranium extraction zone to contact an extractant comprising 0.3 molar di(2 ethylhexyl) phosphoric acid and 0.075 molar tri-n-octylphosphine oxide in kerosene. The organic to aqueous ratio in each stage is 1:1 with a 5 minute mix time in each stage. The temperaure is maintained at about 35 degrees C. The uranium loaded organic phase is withdrawn from the second extraction zone and scrubbed in a three stage scrubbing circuit with water.

The organic to aqueous scrubbing ratio is maintained at about 5:1. The temperature is maintained at about 35 degrees C. and the mix time is about 8 minutes in each stage. The uranium loaded organic phase then is introduced into a two stage stripping zone. The uranium loaded organic is contacted with a stripping solution comprising about 0.7 molar ammonium carbonate in a two stage process. The pH of the equilibrium solution in the stages is maintained in the range of from about 8.5 to 9.1 by the addition of ammonia. The organic to aqueous ratio of the stripping process is about 5:1 with an organic to aqueous ratio maintained in each stage of about 1:0.8 by means of an aqueous recycle. The mix time in each stage is about 5 minutes and the temperature is maintained at about 50 degrees C.

The stripped organic phase then is contacted with an acidic scrub liquor comprising 5 percent sulfuric acid to reconvert the di(2 ethylhexyl) phosphoric acid from an ammonium salt to an acid.

The uranium recovery is found to exceed 96 percent of the uranium present in the WPA.

The vanadium and uranium products are recovered substantially free of contamination from the other product. The separated organic phases from the various stripping operations are suitable for recycle in the process to their respective extraction zones and are not contaminated by one another.

While the present invention has been described with regard to that which is considered to be the preferred embodiments, it is to be understood that changes or modifications can be made in the process or apparatus without departing from the spirit of the invention as set forth in the appended claims.

We claim:

1. A process for sequentially recovering vanadium and uranium, each substantially free of contamination by the other, comprising:

contacting an aqueous acidic solution containing vanadium in the pentavalent state, uranium in the hexavalent state and at least about 0.25 mole fluoride per mole vanadium with a first organic extractant consisting essentially of a water immiscible organic diluent and a neutral organo-phosphorus compound, or oxonium salts thereof, said compounds having the formula wherein R, R' and R" are selected from the group consisting of hydrogen, alkyl, cycloalkyl, aryl, aralkyl, alkoxy and aryloxy radicals, provided that R, R' and R" are not all hydrogen, to form a first organic phase containing the vanadium separate from the aqueous acidic solution;

contacting said first organic phase containing the vanadium with an aqueous stripping solution to separate the vanadium from said first organic phase;

recovering the aqueous stripping solution containing vanadium;

contacting said aqueous acidic solution remaining after contact with the first organic extractant with a second organic extractant consisting essentially of a water immiscible organic diluent, a neutral organophosphorus compound or oxonium salts thereof, said compounds having the formula wherein R, R' and R" are selected from the group consisting of hydrogen, alkyl, cycloalkyl, aryl, aralkyl, alkoxy and aryloxy radicals, provided that R, R' and R" are not all hydrogen, and a dialkylphosphoric acid having the formula wherein $R_1$ and $R_2$ represent alkyl radicals, the total number of carbon atoms in said dialkylphosphoric acid being at least 10, to form a second organic phase containing the uranium separate from the aqueous acidic solution;

contacting said second organic phase with an aqueous stripping solution to separate the uranium from said second organic phase; and recovering the aqueous stripping solution containing uranium.

2. The process of claim 1 wherein the second organic phase containing the uranium is treated by:

contacting the second organic phase with a reductive stripping solution to separate the uranium from said second organic phase;

removing the reductive stripping solution containing reduced uranium;

oxidizing the reduced uranium to provide an oxidized stripping solution containing uranium in the hexavalent state;

contacting the oxidized stripping solution with the second organic extractant to form a third organic phase containing the uranium separate from the oxidized stripping solution;

removing the third organic phase containing the uranium;

contacting the third organic phase with an aqueous stripping solution to separate the uranium from said third organic phase; and recovering the aqueous stripping solution containing uranium.

3. The process of claim 2 wherein the molar concentrations of the neutral organo-phosphorus compound and dialkylphosphoric acid in the second organic extractant are greater when first contacting the aqueous acidic solution to form the second organic phase that when contacting the oxidized stripping solution to form the third organic phase.

4. The process of claim 2 wherein the molar concentrations of the neutral organo-phosphorus compound and dialkylphosphoric acid in the second organic extractant are 0.1 and 0.4, respectively, when first contacting the aqueous acidic solution to form the second organic phase and 0.075 and 0.3, respectively, when contacting the oxidized stripping solution to form the third organic phase.

5. The process of claim 2 wherein the molar concentrations of the neutral organo-phosphorous compound and dialkylphosphoric acid in the second organic extractant when contacting the aqueous acidic solution to form the second organic phase are different from the molar concentrations in the second organic extractant when contacting the oxidized stripping solution to form the third organic phase.

6. The process of claim 2 wherein at least one of the selected members from the groups of radicals represented by R, R' and R'' in the formula of the neutral organo-phosphorus compound or $R_1$ and $R_2$ in the formula of the dialkylphosphoric acid of the second organic extractant when first contacting the aqueous acidic solution to form the second organic phase is different from the selected numbers when contacting the oxidized stripping solution to form the third organic phase.

7. The process of claim 2 wherein the reductant in the reductive stripping solution is ferrous iron.

8. The process of claim 1 wherein the neutral organo-phosphorus compound is tri-n-octylphosphine oxide.

9. The process of claim 1 wherein the neutral organo-phosphorus compound of the first organic extractant is tri-n-octylphosphine oxide and is present in an amount of from 2 to 10 moles per mole of vanadium present in the aqueous acidic solution.

10. The process of claim 1 wherein the dialkylphosphoric acid is di(2 ethylhexyl) phosphoric acid.

11. The process of claim 1 in which the extraction of the vanadium and uranium is carried out continuously with the aqueous acidic solution being contacted countercurrently with the first and second organic extractants.

12. The process of claim 1 wherein about 0.15 to 10 volumes of the first organic extractant is employed for each volume of the aqueous acidic solution.

13. The process of claim 1 wherein about 0.15 to 10 volumes of the second organic extractant is employed for each volume of the aqueous acidic solution.

14. The process of claim 1 wherein the neutral organo-phosphorus compound of the second organic extractant is tri-n-octylphosphine oxide and the dialkylphosphoric acid of the second organic extractant is di(2 ethylhexyl) phosphoric acid, the molar ratio of di(2 ethylhexyl) phosphoric acid to tri-n-octylphosphine oxide being in the range of from about 20:1 to about 1:10.

15. The process of claim 1 wherein the neutral organo-phosphorus compound of the second organic extractant is tri-n-octylphosphine oxide and the dialkylphosphoric acid of the second organic extractant is di(2 ethylhexyl) phosphoric acid, the molar ratio of di(2 ethylhexyl) phosphoric acid to tri-n-octylphosphine oxide being in the range of from about 6:1 to about 1:4.

16. The process of claim 1 wherein the water immiscible organic diluent comprises at least one hydrocarbon.

* * * * *